(12) United States Patent
Mikhailov et al.

(10) Patent No.: US 9,544,051 B2
(45) Date of Patent: Jan. 10, 2017

(54) METHODS AND SYSTEMS FOR BULK DISPERSION MONITORING

(75) Inventors: Vitaly Mikhailov, Dunellen, NJ (US); Paul S. Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 471 days.

(21) Appl. No.: 14/115,822

(22) PCT Filed: May 7, 2012

(86) PCT No.: PCT/US2012/036856
§ 371 (c)(1),
(2), (4) Date: Feb. 3, 2014

(87) PCT Pub. No.: WO2012/154703
PCT Pub. Date: Nov. 15, 2012

(65) Prior Publication Data
US 2014/0140693 A1 May 22, 2014

Related U.S. Application Data

(60) Provisional application No. 61/483,554, filed on May 6, 2011.

(51) Int. Cl.
H04B 10/08 (2006.01)
H04B 10/079 (2013.01)
H04B 10/077 (2013.01)

(52) U.S. Cl.
CPC .... H04B 10/07951 (2013.01); H04B 10/0775 (2013.01); H04B 2210/07 (2013.01)

(58) Field of Classification Search
CPC ............ H04B 10/2507; H04B 10/2513; H04B 10/6161; H04B 10/0795; H04B 10/07951; H04B 10/07953
USPC ...... 398/29, 25, 26, 27, 33, 38, 81, 147, 79, 398/158, 159, 202, 208, 209; 356/73.1
See application file for complete search history.

(56) References Cited

U.S. PATENT DOCUMENTS

| | | | |
|---|---|---|---|
| 7,389,049 B2* | 6/2008 | Takahara ............ | H04B 10/2513 398/147 |
| 2007/0071447 A1* | 3/2007 | Ozaki .............. | H04B 10/25133 398/147 |
| 2008/0089695 A1* | 4/2008 | Ohtani ............. | H04B 10/25133 398/147 |
| 2008/0181616 A1* | 7/2008 | Takeshita ......... | H04B 10/25133 398/147 |
| 2012/0189320 A1* | 7/2012 | Zelensky ........... | H04B 10/2569 398/158 |

* cited by examiner

*Primary Examiner* — Hanh Phan
(74) *Attorney, Agent, or Firm* — Cantor Colburn LLP

(57) ABSTRACT

A method and system for measuring chromatic dispersion, experienced by ASK/PSK modulated optical signals, are provided. Dispersion measurement is enabled either by encoding an additional overhead at lower baud rate or by monitoring signal SOP or RF spectrum of signal SOP. The bulk chromatic dispersion of the link is measured by analyzing the dispersion broadening of the overhead constellation or signal temporal diagram, or time-overlapped signal diagram, or overhead spectrum. This information is used to reduce the computation time required for electronic recovery of a highly dispersed signal.

22 Claims, 7 Drawing Sheets

METHODS AND SYSTEMS FOR BULK DISPERSION MONITORING

CROSS REFERENCE TO RELATED APPLICATIONS

The present application claims the benefit of U.S. Provisional Patent Application Ser. No. 61/483,554 filed on May 6, 2011, which is incorporated herein by reference in its entirety.

BACKGROUND

Aspects of the present invention relate to dispersion of a signal during transmission. More specifically, it is related to monitoring of bulk dispersion of an optical signal in an optical fiber. Bulk dispersion is used generally to mean a large level of dispersion such as that which would arise in a long length, such as many kilometers, of optical fiber, or an entire link (a length of fiber between two nodes) or several links of fiber.

Dispersion is commonly dependent on a length of a transmission path, dispersion parameters associated with the fibers within the signal path (typically expressed in ps/nm/km), and some other properties of the transmission path. Many optical systems require dispersion compensation either optically, using special types of optical fibers or optical devices, or, electronically at the receiver. Dispersion compensation requires knowledge of the amount of bulk dispersion accumulated by the signal. Although bulk dispersion can be measured for a fixed link, it becomes path-dependent in dynamically reconfigurable and wavelength routed systems where the signal path can change rapidly in time. When an optical network is reconfigured, new values of bulk dispersion must be established as the total length and a particular dispersion of the fiber change. Current methods typically require a certain amount of computation time, which is often far too long for a rapid reconfiguration. Currently, there is no solution to measure >1 ns/nm dispersion for >40 Gb/s signals using only the signal itself, especially when the signal carries live traffic. A current system using 100G data and measuring eye closure on cush signals would be limited to several 100 ps/nm of dispersion before the eye closure would become too great for further quantification of the dispersion penalty Accordingly, improved methods and apparatus to determine and monitor bulk signal dispersion that overcome the above limitations of the prior art are desired.

SUMMARY OF THE INVENTION

In accordance with an aspect of the present invention, a method to determine a measure of dispersion in a transmission path of a payload signal with an overhead signal added to a payload signal is provided. The method includes the steps of transmitting the signal over the transmission path, detecting the signal, generating a detected overhead signal, and analyzing the signal to determining a measure of dispersion induced distortion, or dispersion degradation, in the detected overhead signal. Aspects of this method include using one or more detectors to detect the signal.

In accordance with further aspects of the present invention, the steps of inserting the overhead signal into the signal in front of the payload signal and modulating the overhead signal on top of the payload signal using polarization, phase or intensity modulation may be included. In this case, the modulation frequency is lower than a frequency of the payload signal. In accordance with a further aspect of the present invention, the detecting step may use a polarization, phase or intensity detector. In one embodiment, the detector can have a bandwidth comparable or higher than the payload bandwidth. The detector can also include an integrator. In other embodiments, the detector can be a polarimeter.

In accordance with a further aspect of the present invention, the analyzing step includes measuring time-overlapped signal diagram properties (for example, an eye closure) in the detected overhead signal and relates such properties to dispersion degradation.

In accordance with another aspect of the invention, the signal is an optical signal and the transmission path is an optical fiber.

In accordance with another aspect of the invention, a payload baud rate is higher than 1 Gb/s. In accordance with another aspect of the invention, a frequency of the overhead signal is related to a fixed or variable bit rate and is higher than 50 kB/s.

In accordance with another aspect of the invention, the signal is modulated by applying a Code Division Multiple Access (CDMA) coding scheme. The detected overhead signal is decoded using a CDMA decoder, and the measure of dispersion is determined using a time-overlapped signal diagram (for example, a polarization constellation monitor). Other embodiments include determining dispersion in the detected overhead signal from a signal temporal diagram analysis or from a radio frequency spectrum.

In accordance with another aspect of the invention, the transmission path is longer than 100 miles.

In accordance with another aspect of the invention, the signal is multiplexed by a Wavelength Division Multiplexer with other signals before transmission. Further, the signal is demultiplexed by a Wavelength Division De-Multiplexer from the other signals before detection of the overhead signal.

In accordance with another aspect of the present invention, the measure of dispersion is applied to a Digital Signal Processor to minimize related effects to the signal. The measure of dispersion can also be used to determine a modification in the transmission path in accordance with another aspect of the present invention.

In accordance with another aspect of the invention, the overhead bit rate is varied.

In accordance with another aspect of the invention, information about dispersion experienced by the signal is obtained both during the transmission of the signal and at destination.

In accordance with another aspect of the invention, a signal is routed according to the dispersion experienced by the signal.

A system generally corresponding to the methods set forth above is also provided in accordance with an aspect of the present invention.

The system includes a receiver to receive a signal propagating over a transmission path, one or more detectors that detect the signal, one or more detectors to detect an overhead signal, and an analyzer for determining a measure of dispersion induced distortion in the detected overhead signal.

In accordance with various aspects of the present invention, the overhead signal may be inserted into the signal in front of the payload, or can be modulated on top of the payload signal using polarization, phase or intensity modulation. The modulation frequency, in one embodiment, is lower than a frequency of the payload. The detector can be a polarization, phase or intensity detector. The detector can include an integrator. The detector can be a polarimeter.

In accordance with another aspect of the invention, the analyzer measures time-overlapped signal diagram properties (for example, eye closure) in the detected overhead signal and relates these properties to dispersion degradation.

In accordance with another aspect of the invention, the signal is an optical signal and the transmission path is an optical fiber. The measure of dispersion is determined using a polarization time-overlapped signal diagram (for example polarization constellation monitor). Alternately, the measure of dispersion in the detected overhead signal can be determined from a signal temporal diagram analysis or a radio frequency spectrum.

In accordance with another aspect of the invention, the signal is demultiplexed by a Wavelength Division De-Multiplexer from the other signals before detection of the overhead signal. Also, a Digital Signal Processor can be provided to use the measured dispersion to minimize related effects in the bulk of the signal.

DESCRIPTION OF PREFERRED EMBODIMENTS

Figure 1:
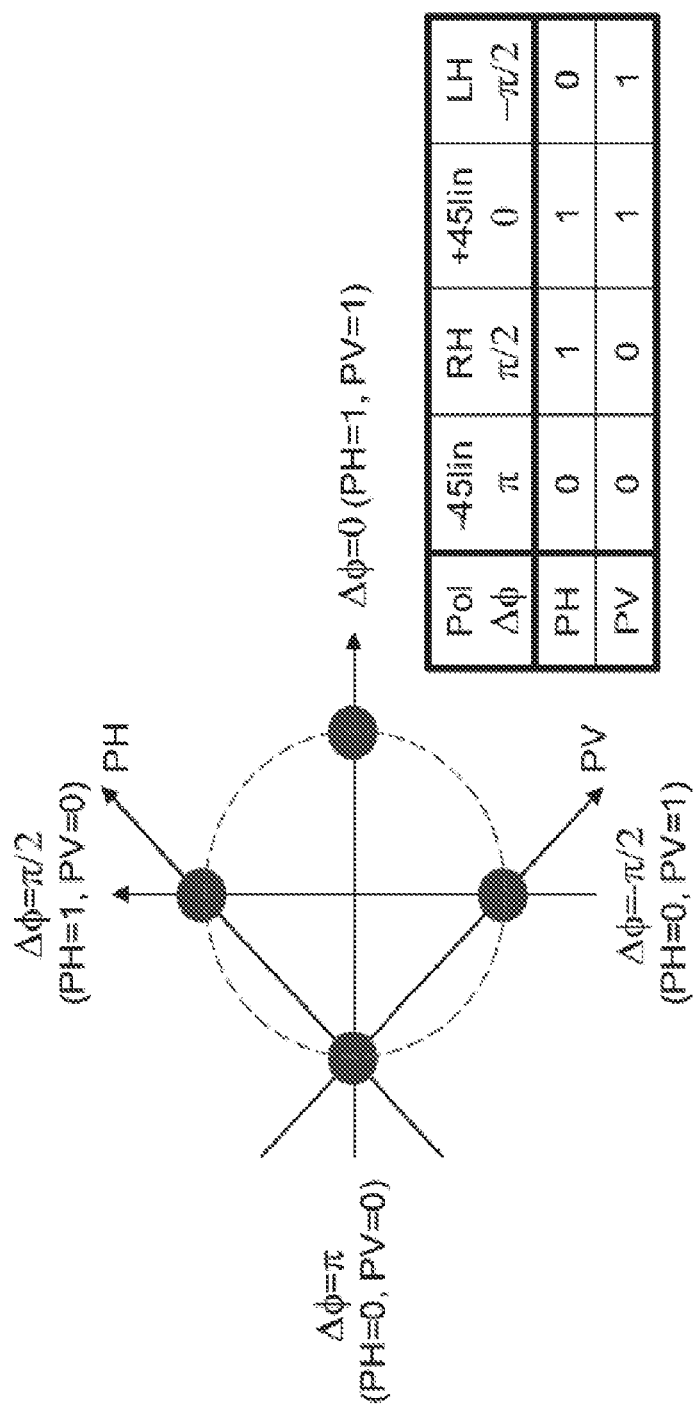
FIG. 1 illustrates a signal constellation, which is a signal temporal diagram with 2 or more points in polarization plane, in accordance with an aspect of the present invention.

One aspect of the present invention is motivated by requirements for high-speed optical networks (high speed defined herein as greater than 40 Gb/sec), though aspects of the invention are also applicable to non-optical and/or lower speed signal transmission. Optical networks must simultaneously grow faster, become more efficient, and more flexible to meet rapid growth and changes in the communication markets. It is now widely accepted that long-haul fiber transmission at 40 Gb/s and greater likely will utilize dual-polarization quadrature phase-shift keying (DP-QPSK). At the same time, wavelength routing is an essential feature for network efficiency and flexibility, thus lightpath verification methods are being developed to support such routing. Digital labeling techniques attain excellent performance with minimal added hardware, but so far have been reported only for On-Off-Keying (OOK) and Differential-Phase-Shift-Keying (DPSK) modulation at a data rate of 10 Gb/s.

A digital encoding method optimized for systems using DP-QPSK transmission allows for label receivers in systems to operate in a simpler manner. In embodiments of the present invention, a low speed overhead or label is added to a high speed payload. The overhead should naturally be low speed to avoid reduction of information transmitted in the payload. Such a method is designed to encode a low-speed label subchannel in polarization-shift-keying (PolSK) format by choosing appropriate codewords from highspeed DP-QPSK symbols. Correct operation has been verified measuring label error rates in a system with a payload data rate of 40 Gb/s. A receiver design that accommodates rapid polarization rotation during transmission has also been demonstrated.

Digital Label Transcoding For DP-QPSK

Digital label encoding takes place in the source transmitter electronics, before modulation onto the optical carrier. LightLabel for OOK format (LL-OOK), based on Complementary Constant-Weight Coding with Code-Division Multiple Access (CCWC/CDMA), provides a serial binary output, with the label message carried in its low frequency components. There is no interference between label information and payload, and labels from multiple wavelengths ($\lambda$) can be read simultaneously with a single label receiver (LR) without needing to decode the payload bit stream.

Due to high sensitivity achievable with CCWC/CDMA coding, LL-OOK messages can be received by relatively lowspeed (50 kHz-2.5 GHz) receivers attached to low-ratio tap couplers. However, for Dual-polarization quadrature phase shift keying (DP-QPSK), a more sophisticated solution is needed. If the label were encoded in the same DP-QPSK format as the payload, a label receiver would be required to be similar to the payload decoder and become unacceptably complex and expensive. Embodiments of the present invention disclose a transcoding process in which the payload stream is modulated in DP-QPSK format, but the embedded label subchannel appears as a low-rate PolSK signal, allowing for the use of a simple photo-diode (PD) behind a polarizer as the basic label receiver. At the transmitter, a standard DP-QPSK modulator can be used; the only change to accommodate the label is in the coding of the four binary tributaries.

To understand the transcoding process, note that DP-QPSK modulation, usually described as four phase states in each of two independent polarizations, can alternatively be seen as four polarization states with four phase states of the X-polarized component. The two descriptions are fully equivalent. The polarization states may be conveniently identified as +45° linear, −45° linear, left-hand circular, and right-hand circular, representing relative phases of 0, $\pi$, $+\pi/2$, and $-\pi/2$ as shown in FIG. 1, which shows a phasor diagram and state table for polarization states of a DP-QPSK signal. The concept can be extended to any amplitude/phase modulation (AM/PM) single/dual polarization modulation format (note, even for on-off keying (OOK), intensity modulation can be seen as modulation of Stokes vector component S0).

With this polarization-based description of the DP-QPSK signal in mind, it is clear that a simple polarized receiver, comprising a PD behind a polarizer set to +45° linear, will discriminate among the polarization states, meaning a normalized output will be 2 when $\Delta=0$, 0 when $\Delta=\pi$, and 1 otherwise. Referring to the table in FIG. 1, the polarized receiver simply sums the '1' bits in the two polarization tributaries PH and PV. Thus, the label subchannel can be encoded as a low rate PolSK signal by controlling the total number of '1' bits in PH and PV within each codeword.

Figure 2:
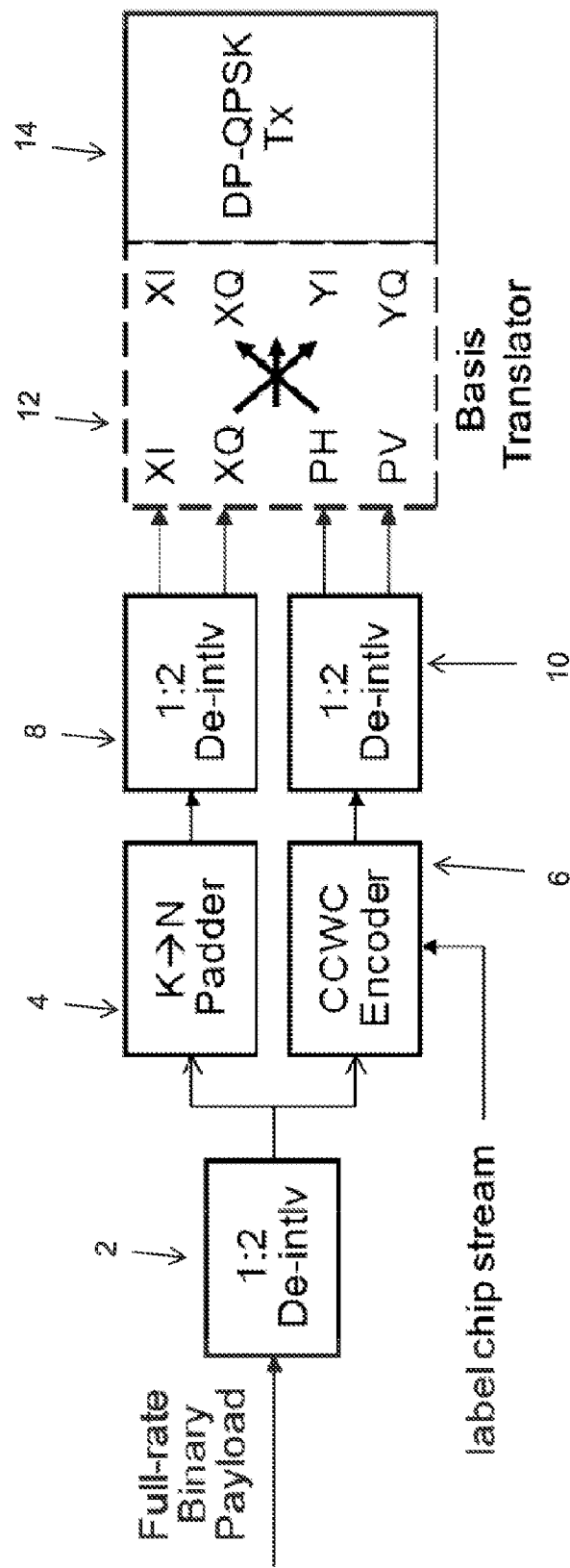
FIG. 2 illustrates a coder, as known in the prior art.

FIG. 2 illustrates a block diagram of such an encoder or transcoder, as known in the prior art. CCWC/CDMA coding developed for LL-OOK to embed a PolSK lightpath label within a DP-QPSK data stream. The full-rate data stream is deinterleaved or demultiplexed into X-phase and polarization substreams using element 2. Encoder 4 then codes the polarization substream while the X-phase stream is padded by circuit 6 to accommodate the overhead (~1-2%) used in the CCWC/CDMA coding. After a second deinterleaving step performed by elements 8 and 10, the PH and PV polarization tributaries carry the PolSK label message. Finally, a basis translator 12 is applied to convert the tributary set {XI, XQ, PH, PV} into the tributary set {XI, XQ, YI, YQ} expected by the standard DP-QPSK transmitter 14.

The receiver described above, with a single polarizer and photodiode, is susceptible to rotation of the state of polarization (SOP) during transmission. This effect and its mitigation have been measured experimentally.

Figure 3:
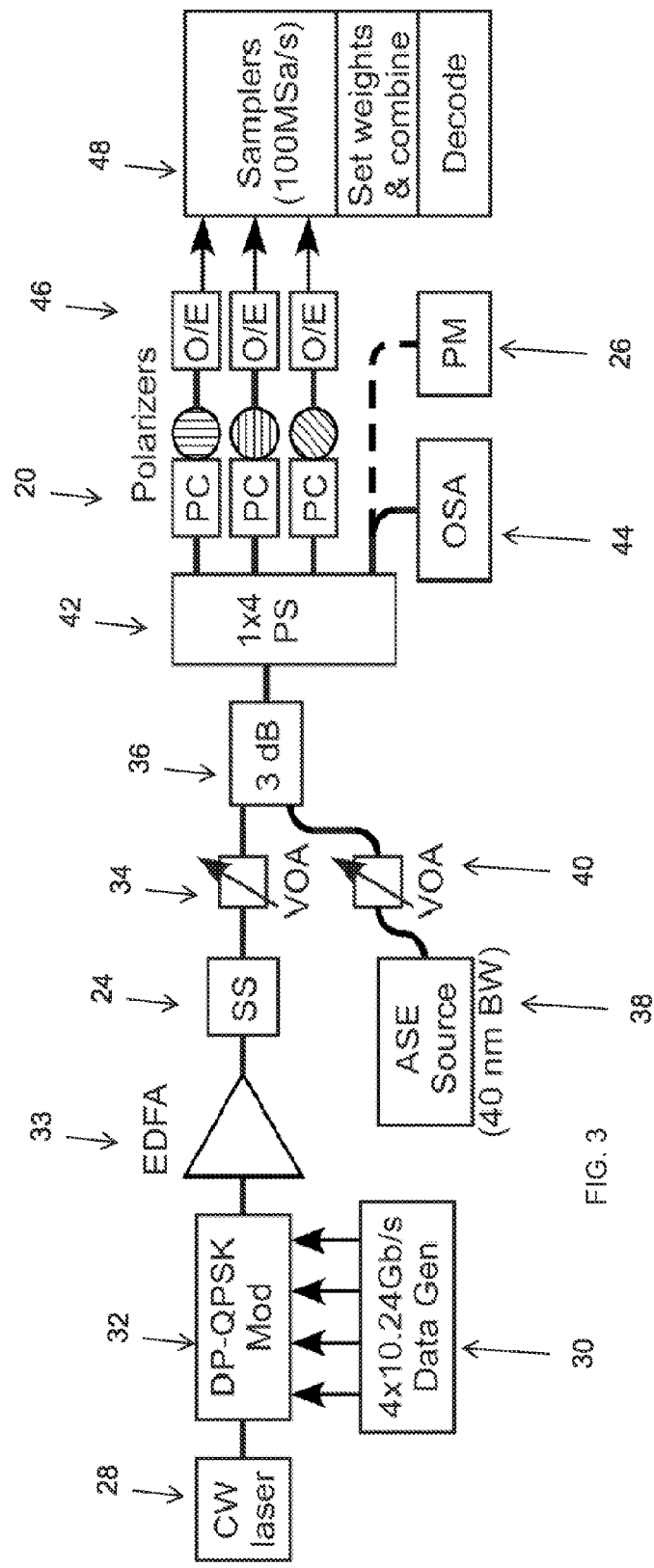
FIG. 3 illustrates a polarization sensitive receiver, in accordance with the present invention.

In accordance with an aspect of the present invention a polarization sensitive receiver is shown in FIG. 3, wherein PC 20 is a manual polarization controller, PS 42 is a power splitter, SS 24 is a computer-controlled synchronous polarization scrambler, and PM 26 is a power meter. A laser 28 and data generator 30 produce a signal that feeds into modulator 32. The signal then is amplified by amplifier 33. The SS 24 scrambles the signal, which is passed through a variable optical attenuator 34 (VOA) to a filter 36. A signal from an amplified spontaneous emission (ASE) source 38 is also passed through a VOA 40 to filter 36, which filters out unnecessary noise. The output of filter 36 is passed through a 1×4 splitter PS 42. Three signals are output from the PS 42 to manual polarization controllers 20 and then through an opto-electronic convertor (such as, for example, a photodiode O/E 46. The outputs from O/E 46 then are provided to a decoder 48, which samples each of the signals, assigns a weight to each signal, then combines the signals and decodes the combined signal. The fourth output from PS 42 can be provided to an optical spectrum analyzer (OSA) 44 and to the polarimeter PM 26. However, as shown in FIG. 3, OSA 44 was used only to characterize the signal to noise ratio and is not a necessary element. Alternately, a polarimeter, such as PM 26, can be used to detect the label. However, in the particular setup of FIG. 3, it is compared with another label receiver based on 1×4 splitter and polarizers.

Experimentally, it was shown that the uncoded payload rate was 40 Gb/s, the encoded rate was 40.96 Gb/s, the LightLabel chip rate was 20 Mchips/s and the frame rate was 100 kframes/s for each λ. An integrated 100G DP-QPSK modulator similar to that described in the OIF standard "Implementation Agreement for Integrated Polarization Multiplexed Quadrature Modulated Transmitters, doc. OIF-PMQ-TX-01.0, Optical Interconn. Forum, available from <URLwww.oiforum.com>, (2010)" was used to generate the signal and a flattened ASE source provided broadband noise from 1530-1564 nm. Both a polarimeter and synchronous scrambler were included in the transmission path to study the effect of State-of-Polarization (SOP) rotation on receiver performance. CCWC/CDMA and related encoding of label data or label frames has been described in U.S. Pat. No. 7,512,342 to Feuer et al. issued on Mar. 31, 2009 and which is incorporated herein by reference.

Accordingly, a transcoding method has been described that produces PolSK labels embedded within a DP-QPSK data stream, and can be used in for digital lightpath labeling for 40 Gb/s and higher speed transmission systems. A polarization-diverse receiver based on an integrated inline polarimeter successfully recovered the labels over all states of polarization rotation and scrambling.

Bulk Chromatic Dispersion

One aspect of the present invention provides a method and a system for polarimetric bulk chromatic dispersion measurement using overhead information in phase/amplitude modulated transmission systems.

Recent advances in digital signal processing allow electronic compensation of chromatic dispersion at the receiver. This is typically done by the combination of fixed and dynamic reconfigurable finite impulse response (FIR) filters to compensate for the bulk and variable parts of chromatic dispersion. It has been calculated that compensation of every 1000 ps/nm dispersion requires 2.2 filter taps for 10 Gbaud/s and 17.2 taps for 28 Gbaud/s. It is known that an infinite impulse response filter (IIR) can also address dispersion. Typically, coherent receivers have 10-20 dynamic taps to compensate for residual dispersion, polarization mode dispersion (PMD) and polarization rotation and >100 fixed reconfigurable taps, where knowledge of chromatic dispersion is required. Note that even in the future it would be difficult to increase the number of dynamic taps as this would slow the convergence algorithm and make it more susceptible to collapse. Therefore, to operate over 2000-4000 km links without optical dispersion compensation, the receiver should be provided with a value of chromatic dispersion within the range of 0-64 ns/nm with the accuracy of +/−1 ns/nm.

This can be done relatively easily for the fixed point-to-point systems by pre-measuring dispersion or simply trying different chromatic dispersion values at the receiver side (although this can take a considerable amount of time, up to a few minutes). However, for systems with dynamic signal routing, or systems operating with alternative paths due to cable breaking, the dispersion accumulated during the transmission is path dependent. Thus, for rapid reconfiguration of signal routes, fast knowledge of the bulk chromatic dispersion is required.

It is known and as was illustrated above for DP-QPSK, that polarization multiplexed N-PSK or QAM signals can be seen as N-point polarization modulation in Stokes space. Therefore, a polarimeter can be used to extract the information about the signal constellation, and then used to obtain information about the bulk chromatic dispersion. It has also been demonstrated above that by adding an overhead to blocks of information using CCWC/CDMA coding, the label can be encoded using polarization shift keying (PolSK) at a fraction of the baud rate. This label in general has information about the destination of the packet and also can be used to supply the dispersion value to the receiver, but again, this requires knowledge of the signal path before the transmission.

As an aspect of the present invention, a method is presented to measure the bulk chromatic dispersion of the link by analyzing the dispersion broadening of the overhead constellation, eye diagram or any other time overlapped or non-overlapped signal diagram or signal spectrum.

Figure 4:
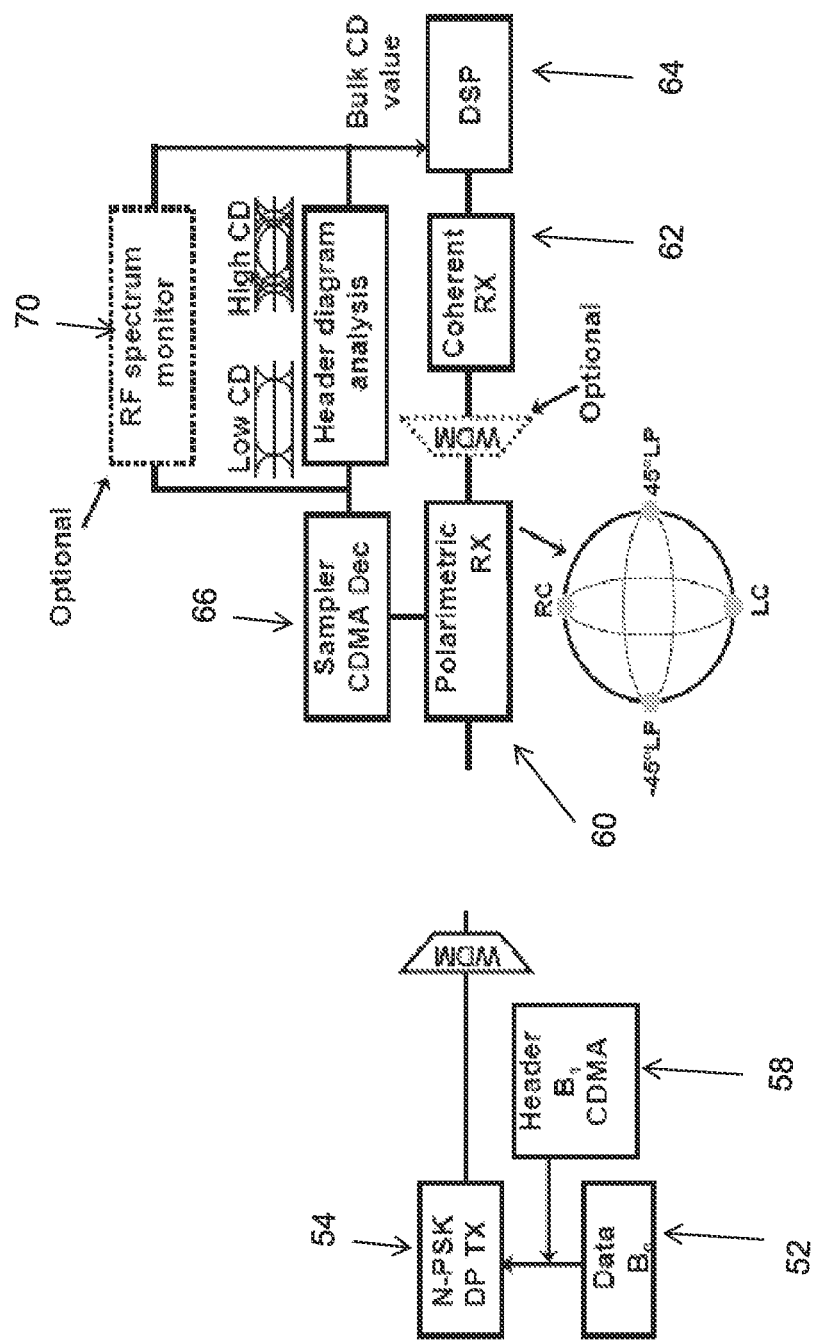
FIGS. 4-6 illustrate transmission systems, in accordance with several aspects of the present invention.

FIG. 4 shows, in diagram, a coherent transmitter (Tx) and receiver (Rx) with bulk polarimetric dispersion measurement capability, according to an embodiment of the present invention. The overhead 58 at the bit rate B1 inserted into the transmitted payload 52 (bit rate B0) and the resulted bitstream is transmitted by a transmitter 54. The overhead can contain information about the payload, or be a pseudo-random or specific bit sequence. It can be inserted in-front of the payload or encoded on-top of the payload. The bit-rate of the overhead can be fixed or varied as well as the total length of the overhead. The transmitted data is encoded on two polarizations using N-PSK, N-ASK or N-QAM modulation format. For example, for QPSK (4-PSK) modulation format, the phase on each polarization changes between 0, π/2, π and 3π/4 with the constant amplitudes. The polarimeter, operating at the baud rate will see this signal as PolSK signal with the polarization changes between +45, right circular (RC), −45 and left circular (LC) states of polarization. As described above, DP-QPSK format can be used to encode the low speed overhead information, for example by adding additional ones and zeroes into blocks of information. At the receiver, the overhead can be decoded by the low speed (comparable to the overhead bit rate) polarimeter. It was suggested that a particular CCWC/CDMA coding has an advantage of simple implementation and colorless operation (it is important for WDM-free coherent receiver). The signal is received by receivers 60 and 62 and input to a digital signal processor 64, optionally through a wavelength division multiplexer WDM. A decoder 66 strips out the overhead. The overhead is analyzed by an analyzer 68 and optionally by a RF spectrum monitor 70. That information is fed to the digital signal processor 64.

The analysis performed strongly depends on the particular implementation. In general one of the techniques would be to monitor temporal broadening of the overhead. If the overhead was FEC encoded, FEC BER can also be analyzed. BER is the bit-error rate, FEC is the forward-error correction. Basically, FEC reduces the number of errors in digital data and can calculate the number of corrected errors (i.e. BER in un-corrected signal). BER is typically a measure of how significantly signal was distorted. Errors in particular data patterns (for instance detection of 111 instead of 101 sequence) can give a clue about the source of the signal distortion, as well as provide other information.

One aspect of the present invention is to use the overhead signal diagram (for example eye, polarization constellation or time overlapped signal diagram) to estimate the dispersion broadening. While at a relatively low overhead data rate (50 kB/s-2.5 Gb/s), other deterministic distortions like PMD, fiber nonlinearities, etc. are insignificant, in contrast, dispersion induced pulse broadening would be enough to generate sufficient signal distortion to calculate bulk chromatic dispersion within the required tolerance. In order to achieve this, the incoming data should be sampled or oversampled to measure the signal diagram and eye- or constellation-analysis methods should be applied. The technique can easily be extended to higher points N-PSK, N-ASK or N-QAM data modulation format or other form of overhead encoding.

A variable bit-rate overhead can be used to increase the accuracy and the range of dispersion measurement. In this case, different parts of the overhead would be broadened differently, thus increasing the accuracy of broadening measurement and extending the range of total accumulated dispersion. This can also be done by using a specific overhead sequence, containing digital words of different lengths.

Polarization modulation is intended to mean possibly a polarization modulation generated by manipulating the data sequence generated at a transmitter Tx. Note that it is not necessary for the polarization modulation to be imposed by a separate polarization controller or modulation. It can be added solely through changes in the coherent bit sequence. Alternately, a separate polarization, phase or intensity modulator can be used.

Figure 5:
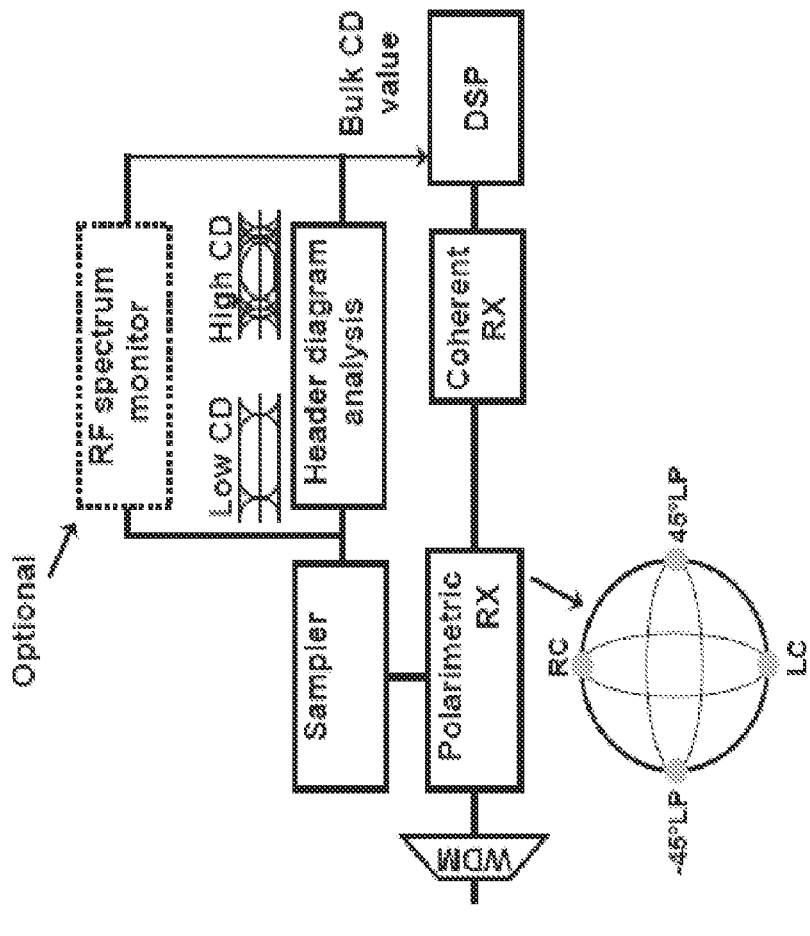
Figure 6:
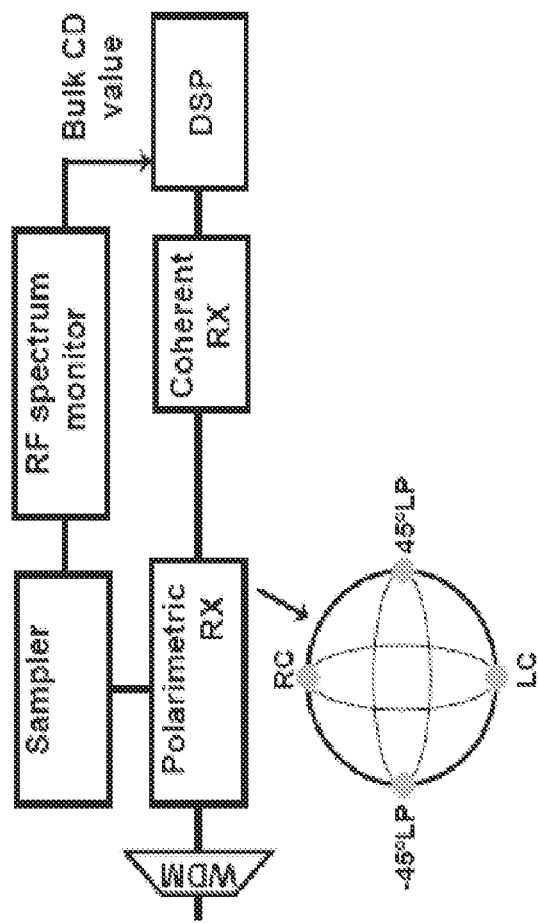
Figure 6:
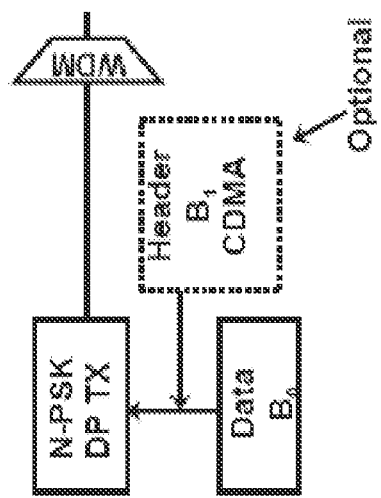

FIGS. 5 and 6 illustrate other embodiments and variations of the present invention. In FIG. 5, the transmitted data is encoded on two polarizations using N-PSK or N-QAM modulation format at baud rate Bd. Since the phase variation on two polarization tributaries has pre-determined values, in the Stokes space such format looks like jumps between N points on (for PSK) or on and within (for QAM) the Poincare sphere. For example, for QPSK, phase varied between 0, π π/2, π and 3π/4 values on both tributaries synchronously. Therefore, there would be 4 determined phase differences between polarization tributaries, and the combining SOP of both tributaries (or the whole signal) would change between +45, right circular (RC), −45 left circular (LC) states of polarization.

The additional data (overhead) is encoded at the transmitter by adding an overhead to the transmitted data such as:
1) Using polarization modulation at baud rate B1. This can be realized by adding a few extra bits to every m-bit block of transmitted information (a k-bit overhead) in such a way that the within the block of information, the probability of certain phase difference between polarization tributaries increases. The overhead baud rate would be defined by the main data bit rate and the length of m-bit block of transmitted data. The overhead baud rate should be enough to detect dispersion induced distortion at the receiver.
2) Using CDMA coding scheme. This would allow for decoding of the overhead signal without optical demultiplexing of WDM channels or use of coherent receiver.

At the receiver, the overhead signal, encoded using polarization modulation, is detected using a polarization sensitive receiver, a polarization tracking receiver, or a polarimeter. The received signal can be digitally processed (for example, implementing an instrument matrix in the case of a polarimeter) and CDMA decoded. The eye or constellation diagram of the signal is then analyzed to estimate the chromatic dispersion. Alternatively, an RF spectrum of the overhead signal can be analyzed to estimate the dispersion, as is illustrated in diagram in FIG. 6. If the overhead has information encoded with FEC encoding, the overhead signal un-corrected bit-error rate can also be analyzed.

In summary, embodiments of the present invention include, but are not limited to, the below.

A system and method to measure bulk dispersion includes a low speed polarization, amplitude or phase modulation at a carrier modulation frequency f; one or more low speed receiver/detectors with bandwidth BW, such as a photodiode, a polarimeter, or a set of polarimetric sensitive detectors; optionally a WDM wavelength demultiplexer (demux); and a signal temporal diagram monitor.

The signal temporal diagram monitor is basically the evolution of the signal in time domain. It is a more general term for eye-diagram, constellation diagram signal trace analysis, etc. and/or RF spectral monitor. A digital signal processor to analyze the results of the monitors can also be provided. Dispersion degradation would then be extracted from the measured eye diagram. For instance, the spread of points in the constellation diagram, polarization constellation diagram, or other temporal diagram, as measured for instance by the standard deviation of points at the constellation point, would increase with increased dispersion. Thus, the standard deviation over all points at a constellation point would be a measure of dispersion degradation.

An alternate system and method to measure bulk dispersion includes polarization amplitude or phase overhead encoding at a fixed bit rate B1 or variable bit rate B1(t) with a CDMA coding scheme at least for the overhead signal; a polarimetric receiver with bandwidth B2, sufficient to detect an overhead (will depend on overhead particular coding scheme and rate), a CDMA decoder; and, a polarization constellation diagram monitor or signal temporal diagram monitor (with possible conversion to RF spectrum).

This second embodiment of the present invention in accordance with an aspect of the present invention is modified so that the overhead signal is encoded without CDMA coding scheme and therefore, optical channel demultiplexing is required before the polarization sensitive receiver.

In accordance with an aspect of the present invention, bulk dispersion measurement is applied in an electronic dispersion compensation algorithm to reduce the computation time to recover a highly dispersed signal. This can be accomplished using a FIR or an IIR filter.

Yet another system and method for measuring bulk dispersion includes polarization, intensity or phase overhead encoding at either a fixed bit rate rate B1 or a variable bit rate B1(t); a WDM demultiplexer; a polarimetric receiver with bandwidth B2; and a polarization constellation diagram or signal temporal diagram (with possible conversion to RF spectrum and/or an RF spectrum monitor).

In accordance with an aspect of the present invention, a dispersion monitor is used that can measure a maximum measurable dispersion that is above 100 ps/nm.

In accordance with an aspect of the present invention, a RF spectrum to measure chromatic dispersion is monitored instead of an eye or constellation diagram or a signal temporal diagram.

In accordance with an aspect of the present invention, an obtained value of measured chromatic dispersion is fed to a digital signal processor (DSP) of the receiver operating at the line data rate. The obtained value can be used to adjust a FIR/IIR filter used for electronic compensation of chromatic dispersion. Filter constants can be stored in a memory and can be retrieved based on the obtained chromatic dispersion. The memory can contain different stored coefficients, associated with different values of the chromatic dispersion. Alternatively, the desired filter parameters can be calculated by the DSP using the supplied bulk dispersion value. In one embodiment of the present invention, the chromatic dispersion varies in a range that requires different configurations of the FIR (different length of the related shift register, different taps, and different coefficients). Based on the value of the chromatic dispersion, the DSP implements the appropriate FIR filter or other filter. The filter design in this case is a very rapid retrieval of the appropriate filter coefficients. In a further embodiment, a DSP is programmed to calculate the filter configuration based on the chromatic dispersion.

In accordance with an aspect of the present invention, the measured dispersion value is fed to a device in the link other than the receiver DSP. For instance, it can be provided to a device to route a signal to a high dispersion, low nonlinearity path, or to some other dispersion optimized path. It can also be provided to a device to route the signal to a path that helps avoid exceeding total path dispersion limits.

Figure 7:
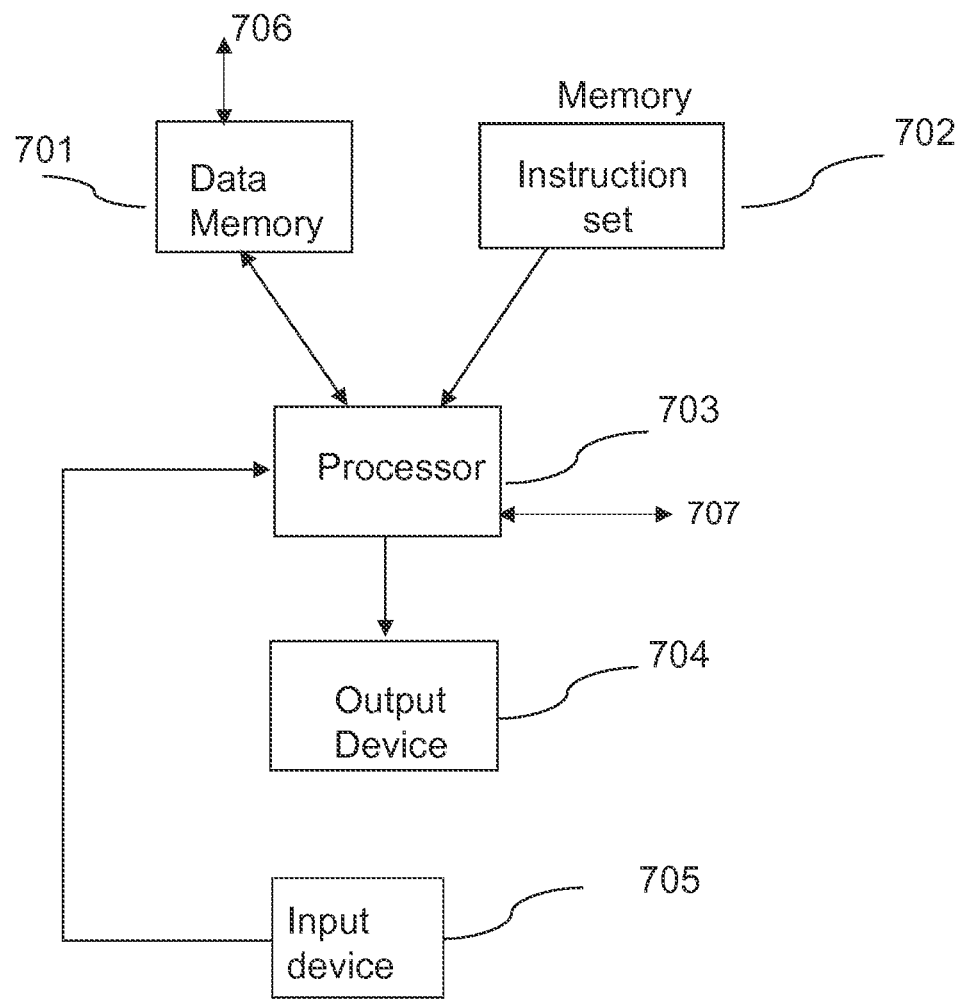
FIG. 7 illustrates a system in accordance with an aspect of the present invention.

Signals such as generated by detectors and data that require further processing as an aspect of the present invention are processed by a system as shown in FIG. 7. The system is provided with data from a memory 701 which can be data obtained from a spectrum analyzer, a constellation monitor or an signal temporal diagram monitor, all of which may provide data to a processor. Data may be provided on an input 706. Data may also be provided by an input device 705 or a data interface. Such data may be provided on for instance a continuous basis. An instruction set or program resides on memory 702 and, after data 701 is retrieved, executes one or more of the methods of the present invention after being provided to the processor 703. Data, such as a measure of dispersion, or FIR filter coefficients, can be outputted on an output device 704, which may be a display to display data or a loudspeaker to provide an acoustic signal. The processor may be part of a DSP and is able to perform the tasks of a DSP. In that case, the processor 703 also receives the signals from the coherent receiver to address the dispersion. The processor also has a communication channel 707 to receive external data from a device such as the coherent receiver and to transmit data to an external device. In a further embodiment of the present invention, the system may also determine a FIR configuration based on a determined measure of dispersion and provide data, such as FIR coefficients via a communication channel to a dedicated DSP that performs the FIR functions on the signal from the coherent receiver. The processor can be dedicated hardware. However, the processor can also be a CPU or any other computing device that can execute the instructions of 702. Accordingly the system as illustrated in FIG. 7 provides a system for data processing that is enabled to execute the steps of the methods as provided herein as an aspect of the present invention.

In accordance with a method of the present invention, steps are taken to determine a measure of dispersion in a transmission path of a signal with an overhead signal and a payload signal. In accordance with one aspect of the present invention, the steps include transmitting the signal over the transmission path and receiving the signal, detecting the signal with one or more detectors to generate a detected overhead signal and an analyzer determining a measure of dispersion induced distortion in the detected overhead signal.

In accordance with other aspects of the invention, the overhead is inserted in the signal in front of the payload. Alternatively, the overhead signal is modulated on top of the payload signal using polarization, phase or intensity modulation. The modulation frequency is preferably lower than a frequency of the payload. The detector can be a polarization, phase or intensity sensitive detector. The bandwidth of the detector can be as high as payload plus overhead clock frequency. The detector can also comprise an integrator.

In accordance with further aspects of the present invention, the analyzer measures changes in signal time-overlapped signal diagram (for example eye closure) in the detected overhead signal and relates this changes to dispersion experienced by the overhead signal.

In accordance with further aspects of the invention, the detector is a polarimeter and the signal is an optical signal and the transmission path is an optical fiber. The payload baud rate can be higher than 2.5 Gb/s. In accordance with an additional aspect of the invention, a frequency of the overhead signal can be related to a fixed or variable bit rate and is higher than 100 kB/s.

The signal can be modulated by applying a Code Division Multiple Access (CDMA) coding scheme, the detected overhead signal is decoded by a CDMA decoder, and the measure of dispersion is determined by using a polarization constellation monitor.

The measure of dispersion in the detected overhead signal can be determined from a signal temporal diagram analysis. It can also be determined from a radio frequency spectrum.

In accordance with another aspect of the present invention, the transmission path is longer than 50 km.

In one embodiment of the present invention, the signal is multiplexed by a Wavelength Division Multiplexer with other signals before transmission. The signal can then be demultiplexed by a Wavelength Division De-Multiplexer from the other signals before detection of the overhead signal.

The measure of dispersion can be used to improve transmissions. For example, the measure of dispersion can be applied to a Digital Signal Processor, or other processor, to minimize an effect of dispersion in the bulk of the signal. Thus, the invention further includes the step of applying the measure of dispersion to determine a modification in the transmission path.

In accordance with another aspect of the invention, the overhead bit rate is varied.

Thus, the invention obtains information about dispersion experienced by the signal is during the transmission of the signal and at destination.

Further, in accordance with another aspect of the invention, a signal is routed according the dispersion experienced by the signal.

Systems corresponding to the method, as described earlier, are also provided. For example, a system to determine a measure of dispersion in a transmission path of a signal with an overhead signal and a payload signal, can include a receiver that receives the signal over the transmission path; one or more detectors that detect the signal to generate a detected overhead signal; and an analyzer determining a measure of dispersion induced distortion in the detected overhead signal.

The system can include all of the features described above. For example the processor can be provided to provide action based on the amount of dispersion, as described above.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A method to determine a measure of dispersion in a transmission path of a signal with an overhead signal and a payload signal, comprising the steps of:
    transmitting the signal over the transmission path;
    detecting the signal with one or more detectors to generate a detected overhead signal; wherein the detector is selected from the group consisting of: a polarimeter, a phase detector, intensity sensitive detector, and an integrator; and
    analyzing the detected overhead signal to determine a measure of dispersion induced distortion in the detected overhead signal.

2. The method of claim 1, further comprising the step of inserting the overhead signal into the signal in front of the payload signal.

3. The method of claim 1, further comprising the step of modulating the overhead signal on top of the payload signal using polarization, phase or intensity modulation.

4. The method of claim 1, wherein the analyzing step further comprises the steps of: measuring changes in signal time-overlapped signal diagram in the detected overhead signal; and relating said changes to dispersion experienced by the overhead signal.

5. The method of claim 1, further comprising the steps of: modulating the signal by applying a Code Division Multiple Access (CDMA) coding scheme; decoding the detected overhead signal using a CDMA decoder; and determining the measure of dispersion using a polarization constellation monitor.

6. The method of claim 1, wherein the measure of dispersion in the detected overhead signal is determined from a signal temporal diagram analysis or from a radio frequency spectrum.

7. The method of claim 1, further comprising the steps of: multiplexing the signal using a Wavelength Division Multiplexer with other signals before transmission; and demultiplexing the signal using a Wavelength Division De-Multiplexer from the other signals prior to detecting the overhead signal.

8. The method of claim 1, further comprising the step of applying the measure of dispersion to a Digital Signal Processor to minimize an effect of dispersion in the bulk of the signal.

9. The method of claim 1, further comprising the step of applying the measure of dispersion to determine a modification in the transmission path.

10. The method of claim 1, wherein overhead bit rate is varied.

11. The method of claim 1, further comprising the step of routing the signal according to the measure of dispersion.

12. A system to determine a measure of dispersion in a transmission path of a signal with an overhead signal and a payload signal, comprising: a receiver that receives the signal over the transmission path; one or more detectors that detect the signal to generate a detected overhead signal; wherein the detector is selected from the group consisting of: a polarimeter, a phase detector, intensity sensitive detector, and an integrator; and an analyzer to determine a measure of dispersion induced distortion in the detected overhead signal.

13. The system of claim 12, wherein the overhead signal is inserted in the signal in front of the payload signal.

14. The system of claim 12, wherein the overhead signal is modulated on top of the payload signal using polarization, phase or intensity modulation.

15. The system of claim 14, wherein a modulation frequency is lower than a frequency of the payload signal.

16. The system of claim 12, wherein the analyzer measures eye closure in the detected overhead signal and relates this eye closure to dispersion degradation.

17. The system of claim 12, wherein the signal is an optical signal and the transmission path is an optical fiber.

18. The system of claim 12 wherein the measure of dispersion is determined by using a polarization constellation monitor or a Poincare sphere monitor.

19. The system of claim 12, wherein the measure of dispersion in the detected overhead signal is determined from a signal temporal diagram analysis.

20. The system of claim 12, wherein the measure of dispersion in the detected overhead signal is determined from a radio frequency spectrum.

21. The system of claim 12, wherein the signal is demultiplexed by a Wavelength Division De-Multiplexer from the other signals before detection of the overhead signal.

22. The system of claim 12, further comprising: a Digital Signal Processor that uses the measure of dispersion to minimize an effect of dispersion in the bulk of the signal.

* * * * *